UNITED STATES PATENT OFFICE 1,941,861

PROCESS FOR THE ELECTRICAL PURIFICATION OF GASES

Richard Heinrich, Berlin-Sudende, Germany, assignor, by mesne assignments, to International Precipitation Company, Los Angeles, Calif., a corporation of California No Drawing. Application August 1, 1930, Serial No. 472,502, and in Germany August 6, 1929

1 Claim. (Cl. 183—7)

My invention relates to a process for the electrical purification of gases.

In hitherto known gas purifying plants the gases generally pass through the plant at a rate of about from 0.5 to 3.5 meters per second. It is proven that such a relatively low speed of the gases presents certain disadvantages. For instance it often occurs that the dust deposits itself on the collecting electrode in the form of coarse flakes or porous masses. This is disadvantageous in that the gas in the pores of the thick layer of dust in the collecting electrode will be strongly ionized, particularly if the precipitated substance is a poor conductor. By this ionization positive discharging clusters are then created on the collecting electrode, thus causing violent flashovers between the discharge electrode and the collecting electrode. This presents considerable difficulties in the electrical purification of many gases. Below is shown how these undesirable phenomena may be eliminated.

According to the invention the gases pass between the electrodes at a rate of more than 10 m/sec. This has the advantage that the dust, which deposits itself on the collecting surfaces, will form, due to the speed of the gas current, a layer of such uniform density that no discharging pores can be created. The speeds for the various kinds of dust and gas may be different, they must, however, amount to at least 10 m/sec. As experience shows, the selection of the speed principally depends on the adherence and upon the grain size of the dust to be precipitated.

In all cases where the voltage between the electrodes is so high that some gases would ordinarily tend to cause a flashover, this tendency is suppressed by the high-speed of the gases.

I have observed that flashover bridges which tend to form between electrodes are suppressed in a nascent state, due to this high gas speed. As an advantage, accruing from a speed of at least 10 m./sec., the safe operating voltage can be increased by about 50%. Thus a relatively higher static field intensity, and consequently a correspondingly better separation of dust results.

I claim as my invention:

A method of electrical precipitation of poorly conducting dust from gases comprising passing a gas containing such dust in suspension between discharge and collecting electrodes to cause precipitation and deposition of such dust on the collecting electrode, and causing the deposited dust to accumulate in a layer on said collecting electrode, the velocity of said gas being maintained in excess of 10 meters per second so as to cause said deposited dust to form a dense uniform layer on the collecting electrode and thereby suppress the tendency for electric discharge to occur from said dust.

RICHARD HEINRICH.